United States Patent Office 2,708,164
Patented May 10, 1955

2,708,164
MALT BEVERAGE

Arnold Spencer Wahl, Chicago, Ill., assignor to Wm. J. Stange Co., Chicago, Ill., a corporation of Illinois No Drawing. Application July 2, 1952,
Serial No. 296,937

5 Claims. (Cl. 99—48)

This invention relates to improvements in beer and other malt beverages, and to methods of making the same.

Malt beverages including beer tend to acquire undesirable tastes and odors upon storage. Several factors are recognized as causing this development of unpleasant tastes and odors in beer. For example, beer acquires an odor commonly known as "skunky" when placed in strong light such as sunlight. Several devices have been utilized heretofore in an attempt to minimize the development of this odor. Brown bottles have been adopted by certain brewers, non-actinic glass is used by others, and still another method is to wrap the beer bottles in amber colored paper.

Another source of undesirable taste and odors is pasteurization of the beer. This is commonly known as the "pasteurized taste" although it actually is not a taste but an odor. This odor is particularly prevalent when the temperature during pasteurization is higher than 140° F. The most common method utilized heretofore to minimize this odor is to subject the beer to the lowest possible hot temperature in the pasteurizer for the shortest possible time.

Another type of disagreeable odors and tastes in beer has been found to develop gradually in bottled beer as the beer becomes older. It is generally recognized that these odors and flavors are due to the atmospheric oxygen which remains in the bottle of beer after crowning. This atmospheric oxygen reacts with certain components in the beer and oxidizes these components to compounds possessing the unpleasant odors and tastes that cause this type of off flavor in beer. This condition can be improved by reducing the atmospheric oxygen in the bottled beer to a minimum but no bottling process to date can eliminate the atmospheric oxygen completely.

Accordingly it is an object of this invention to produce a beer or other malt beverage that will not possess and develop the undesirable tastes and odors that produce the above described off flavors.

More particularly, it is an object of this invention to produce a beer or other malt beverage that will not develop off flavors when subjected to direct strong light such as sunlight, that will not develop a pasteurized taste when properly pasteurized, and which will not acquire an oxidized taste even upon long storage.

Another object of the invention is to improve the palatability and appearance of beer and other malt products.

Another object of the invention is to provide a beer or other malt beverage which will retain its full fresh flavor even after prolonged periods of time.

Still another object of the invention is to provide an additive for beer or other malt beverage that will not change the taste of the fresh beverage and will prevent the formation of off flavors in the beverage even upon prolonged storage.

A further object of the invention is to provide a method of treating beer or other malt beverage that will prevent the formation of disagreeable tastes and odors that would result in an off flavor of the beverage.

It has now been found that these and other objects and advantages of the invention are obtained by adding to beer or other malt beverages after fermentation, an anti-oxidant selected from the group consisting of guaiaretic acid, Nordihydroguaiaretic acid, and homologues of Nordihydroguaiaretic acid.

The above anti-oxidants when added to beer and other malt beverages effectively prevent the formation of the above described objectionable odors and tastes. The preferred anti-oxidant is Nordihydroguaiaretic acid. Although the present invention has application and benefits when used with all malt beverages it has particular application to beer. Accordingly the invention will be described in detail as applied to beer. This is to be construed only as being illustrative but not as a limitation of the invention.

When Nordihydroguaiaretic acid is used as an anti-oxidant in beer, ten parts by weight of the anti-oxidant to one million parts by weight of beer will give good results. Smaller amounts of anti-oxidant may be used and up to as much as one hundred parts by weight or more of anti-oxidant has been found to be satisfactory. It has further been found that the addition of citric acid with the Nordihydroguaiaretic acid increases the effectiveness of the Nordihydroguaiaretic acid and aids in its solubility in the beer. Accordingly the following example will also illustrate the incorporation of citric acid in the anti-oxidant preparation. Instead of adding the anti-oxidant directly to the beer it is desirable first to dissolve the anti-oxidant in a suitable solvent and then add the resultant mixture to the beer. Suitable solvents include glycerine and ethyl alcohol, the preferred solvent being glycerin.

The following example is given by way of illustration and is not to be construed as a limitation of the invention.

EXAMPLE I

One gallon of U. S. P. glycerin is brought to a boil in a suitable container. One pound of chemically pure or U. S. P. citric acid in dry form is added to and dissolved in the boiling glycerin. 1.28 pounds of Nordihydroguaiaretic acid is next introduced and the boiling continued until a brilliantly clear solution is obtained. After the ingredients have been thoroughly dissolved and the solution is cooled, the solution is placed in a dry container with a tight cap or closure. When stored in this manner the solution retains its brilliant appearance indefinitely. The mixture contains 10 percent of Nordihydroguaiaretic acid by weight.

Nordihydroguaiaretic acid has been synthesized from guaiaretic acid. However, the Nordihydroguaiaretic acid derived from plants is preferred. The compound is present in a common desert plant, the creosote bush (*Larrea divaricata*), which grows in the southwestern part of the United States. The preferred compound is that prepared by crystallization if a crude extract of this plant material. A preferred brand is known by the trade name "N. D. G. A." supplied by Wm. J. Stange Co. of Chicago, Illinois.

The following chemical formula has been assigned to the active ingredient, Nordihydroguaiaretic acid:

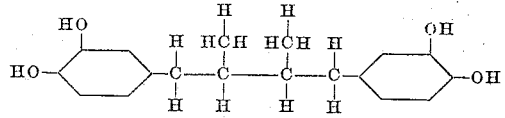

Extensive toxicity experiments conducted over several years indicate that Nordihydroguaiaretic acid is entirely harmless to human beings when taken internally in amounts far in excess to that required to carry out the present invention.

Glycerin is preferred as a solvent for the anti-oxidant in that glycerin is one of the naturally occurring components of beer and therefore will not alter the taste of the final product. More particularly beer contains glycerin in the amount of approximately 2 percent of the ethyl alcohol formed during fermentation. Thus, by adding glycerin as a solvent no foreign or extraneous material is added to the beer. The anti-oxidant including Nordihydroguaiaretic acid is readily soluble in glycerin and quickly and uniformly dispersed by the glycerin throughout the body of the treated beer. Glycerin is available in the open market in a very pure form and is relatively inexpensive. Ethyl alcohol may be used instead of glycerin as a solvent. However, glycerin is preferred because it is less expensive and does not have the slight hydrolyzing action upon the Nordihydroguaiaretic acid which ethyl alcohol has.

The citric acid used in the anti-oxidant preparation is preferably U. S. P. citric acid and is utilized in the dry form. The addition of citric acid to the anti-oxidant preparation aids in dissolving the Nordihydroguaiaretic acid in the glycerin and thereby aids in distributing the anti-oxidant throughout the body of the beer being treated. In addition, a scynergistic action is obtained between the Nordihydroguaiaretic acid and the citric acid. More specifically, the effectiveness of the anti-oxidant is markedly increased in a manner which would not be expected from the use of these two ingredients along or in any other combination. Greater or lesser amounts of citric acid in relation to anti-oxidant may be used if desired, and citric acid or its equivalent may be used with similar beneficial effects with the other anti-oxidants disclosed as well as with the preferred Nordihydroguaiaretic acid.

It is preferred to continue boiling the anti-oxidant mixture after all of the ingredients have been added until the solution is brilliantly clear. This boiling eliminates all moisture which may have entered with the glycerin, the citric acid or the Nordihydroguaiaretic acid. The storage properties of the anti-oxidant mixture are improved if all moisture is removed during preparation of the mixture and is excluded during storage of the mixture.

The above described anti-oxidant preparation includes 10 percent of the active ingredients or anti-oxidant, namely Nordihydroguaiaretic acid. When adding the above preparation to the beer, one gallon of the preparation is added to 400 barrels of beer. This gives 100 parts by weight of anti-oxidant preparation per million parts by weight of beer. It will be seen that the anti-oxidant will be present in the amount of 10 parts by weight of Nordihydroguaiaretic acid per million parts by weight of beer.

The addition of this amount of anti-oxidant solution will retard or eliminate the development of all of the above described undesirable tastes and odors in beer. More particularly, if added before pasteurization, the so-called "pasteurized taste" is substantially eliminated even though a thorough pasteurization is obtained. Also, direct sunlight will fail to develop the characteristic "skunky" taste, and the "oxidation taste" will not be formed even upon long storage.

The following table is given to illustrate the amount of antioxidant solution to add to obtain the desired concentration of antioxidant agent in any given amount of beer. The meaning of the various columns is as follows:

(a) represents the amount of the above described anti-oxidant solution to use in milliliters;
(b) The amount of antioxidant solution expressed in ounces, quarts, and gallons;
(c) is the corresponding barrels of beer; and
(d) is the approximate weight of the beer in pounds.

*Table of amounts of antioxidant solution to use*

| (a) Ml. of Antioxidant Solution | (b) Fluid Ounces of Antioxidant Solution | (c) Barrels of Beer | (d) Weight of Beer |
|---|---|---|---|
| 10 | ---------- | 1 | 260 |
| 100 | ---------- | 10 | 2,600 |
| 400 | ---------- | 40 | 10,400 |
| 473 | 16 oz. | 50 | 13,000 |
| 945 | 32 oz. | 100 | 26,000 |
| 1,890 | 2 quarts | 200 | 52,000 |
| 2,835 | 3 quarts | 300 | 78,000 |
| 3,780 | 1 Gal. | 400 | 104,000 |

The anti-oxidant solution may be added to the beer at any time after fermentation. Good results are obtained when it is introduced into the beer as near to the final filtration as is practicable. The preferred point of addition is in the lines that carry the beer to the bottling tanks. From a practical brewing standpoint, the Nordihydroguaiaretic acid solution is added in a stream by injecting it into the beer stream when the beer is traveling from the finishing tanks to the bottling tanks. The final filtration is performed here and any Nordihydroguaiaretic acid suspensoids that adhere to the filter will be dissolved as a large volume of beer passes through.

The amount of anti-oxidant in the beer can be readily controlled by varying the rate of addition of the anti-oxidant solution to the beer stream. Preferably a synchronized addition of the Nordihydroguaiaretic acid to a flowing beer stream is used. It is to be understood, however, that other suitable systems of mixing the anti-oxidant solution with the beer can be utilized.

It will be seen that there has been provided an anti-oxidant solution which will produce a malt beverage having the desirable characteristics set forth above. In addition, a method has been given for incorporating the anti-oxidant into the beverage. Although certain examples, compositions and methods have been given for purposes of illustration, it is to be understood that various changes and modifications can be made therein without departing from the spirit and scope of the present invention. Accordingly, the invention is to be limited only as set forth in the following claims.

This application is a continuation-in-part of my prior application, Serial No. 141,604, filed January 31, 1950, now abandoned.

What I claim as new and desire to protect by Letters Patent of the United States is:

1. A malt beverage containing an anti-oxidant selected from the group consisting of guaiaretic acid, Nordihydroguaiaretic acid and homologues of Nordihydroguaiaretic acid.

2. A malt beverage containing from about ten (10) to about one hundred (100) parts per million by weight of an anti-oxidant selected from the group consisting of guaiaretic acid, Nordihydroguaiaretic acid and homologues of Nordihydroguaiaretic acid.

3. A malt beverage containing citric acid and from about ten (10) to about one hundred (100) parts per million by weight to the malt beverage of an antioxidant selected from the group consisting of guaiaretic acid, Nordihydroguaiaretic acid and homologues or Nordihydroguaiaretic acid.

4. In making a malt beverage, the addition of an anti-oxidant selected from the group consisting of guaiaretic acid, Nordihydroguaiaretic acid, and homologues of Nordihydroguaiaretic acid, after the malt beverage has fermented, said antioxidant being about ten (10) to about one hundred (100) parts per million by weight.

5. A malt beverage as claimed in claim 3, wherein the ingredients are dissolved in glycerin as a carrier.

References Cited in the file of this patent
UNITED STATES PATENTS

| 1,390,711 | Heuser | Sept. 13, 1921 |
| 2,373,192 | Lauer | Apr. 10, 1945 |

OTHER REFERENCES

Article, Mattil et al., Oil and Soap, June 1944, pages 160–161.